INVENTOR
HARRY A. WINTERMUTE
BY Harold T. Stowell
ATTORNEY

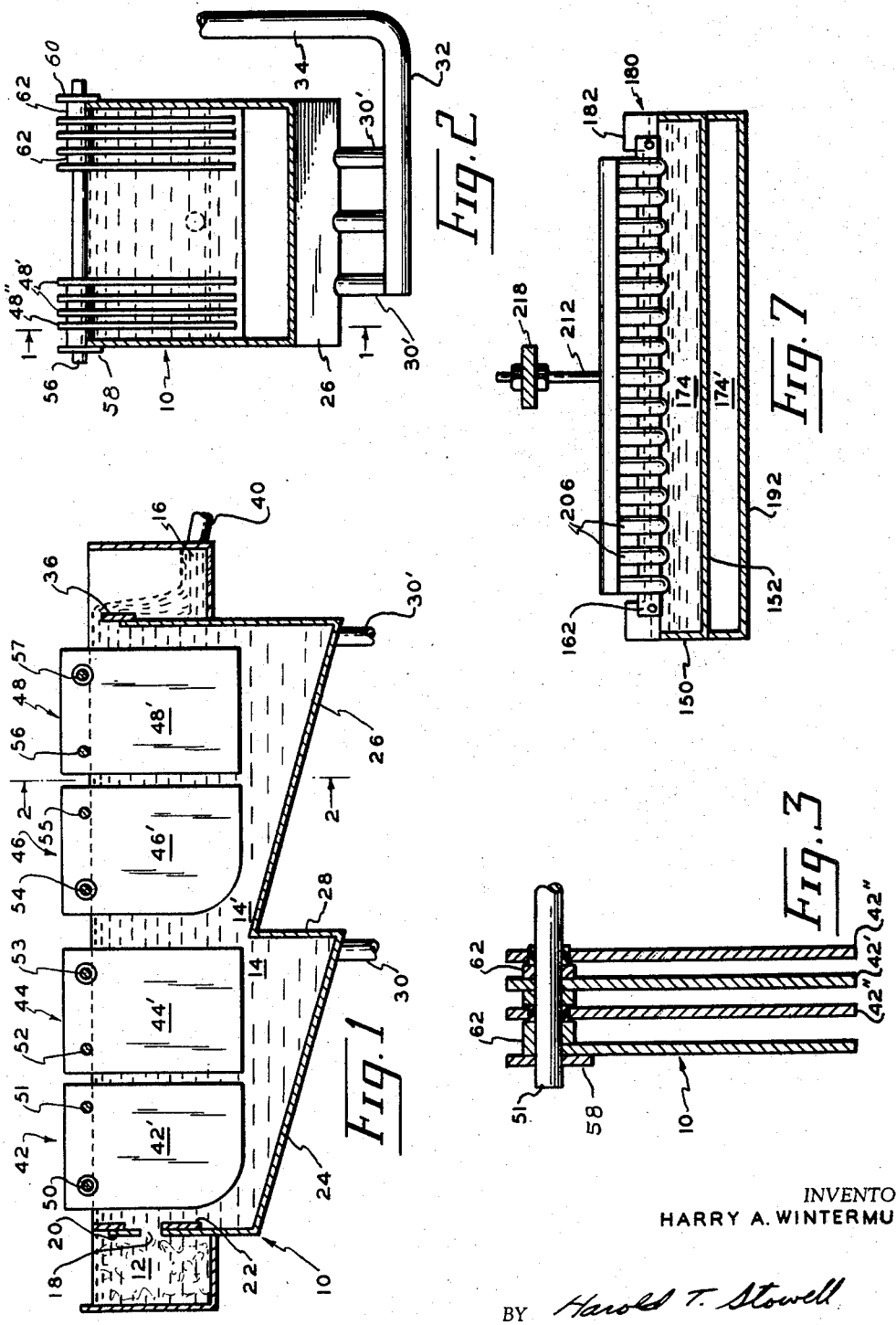

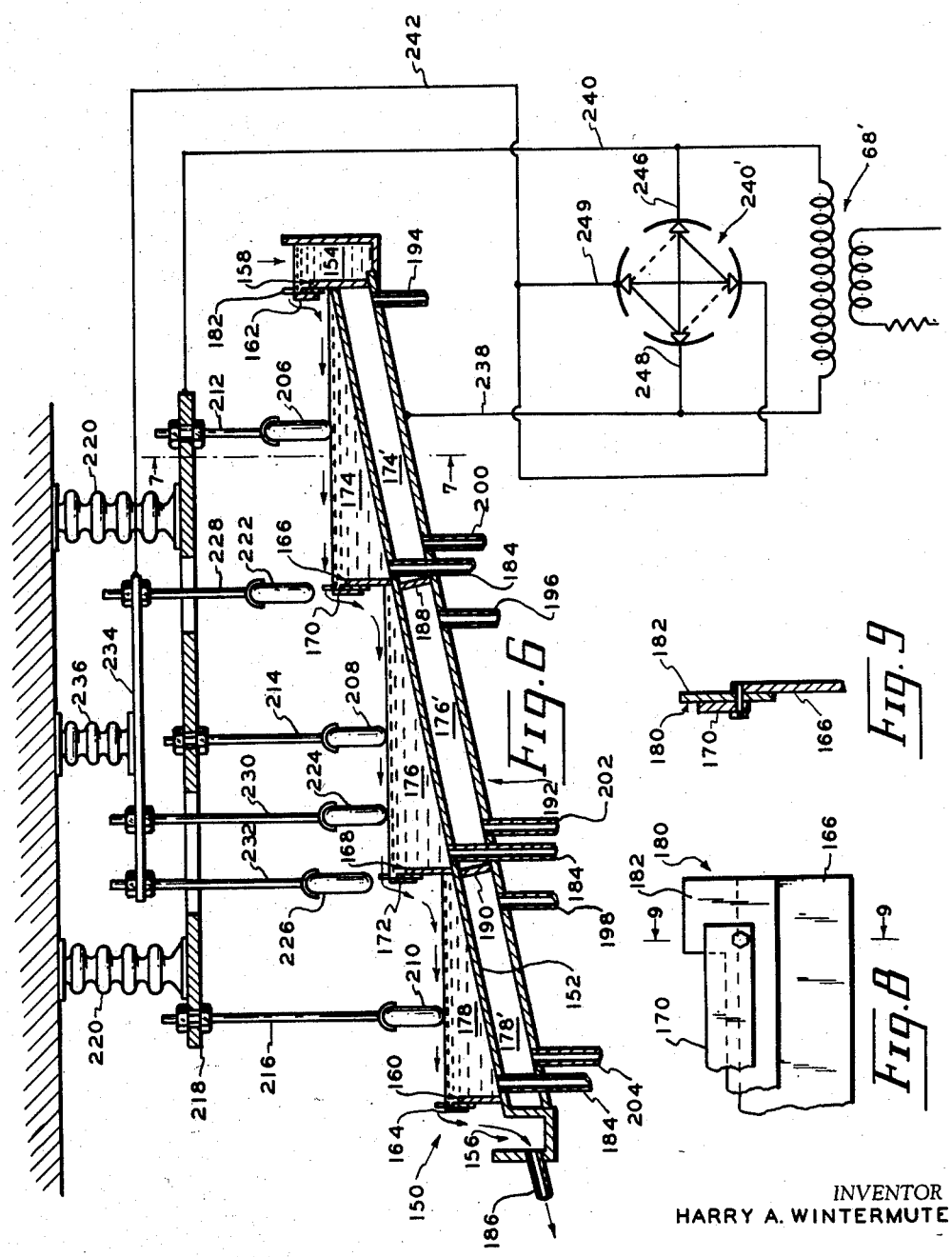

United States Patent Office 2,849,395
Patented Aug. 26, 1958

2,849,395

METHOD AND APPARATUS FOR ELECTRICAL SEPARATION OF EMULSIONS

Harry A. Wintermute, Plainfield, N. J., assignor to Research Corporation, New York, N. Y., a corporation of New Jersey Application September 29, 1953, Serial No. 383,106

3 Claims. (Cl. 204—305)

This invention relates to an improved method and apparatus for separating associated liquids having high resistances or dielectric properties and in particular associations of oil and water in which the particles of one liquid are bound in mechanical suspension in another. This application is a continuation-in-part of my earlier application Serial No. 317,501, filed Oct. 29, 1952, now abandoned.

The invention is particularly applicable for the treatment of oil emulsions wherein the associated liquids have different electrical properties and specific gravities.

In the past, oil has been separated from mixtures which contain in addition to water, tars, waxes, and solids by subjecting the associated liquids to high voltage electrical fields and electrical discharges. The use of either alternating or direct current to produce the high potential fields has also been suggested in the prior art.

The present invention is an improvement in such methods wherein the associated liquids are subjected successively in a plurality of treating zones to alternating high potential fields and spaced unidirectional high potential fields generally provided by a single current source, and wherein means are provided for separating the liquids into layers in each of the plurality of treating zones.

The high potential direct current may be of a pulsating nature as it has been found that different liquids are separated from emulsions more readily by using unidirectional current and alternating current, and others when subjected successively to alternating current and pulsating direct current.

Throughout the specification and claims the term, associated liquids, means a mechanical mixture of oil and water which may contain other liquids, semisolids, and solids incorporated therein such as tars, waxes, sludges, minerals, and the like. The mixture being in the form of a water-in-oil emulsion. This type of emulsion consists of very fine globules of water surrounded by films which generally will not break down under the action of gravity to allow the water to settle out. Frequently such emulsions include minerals and salts in suspension and solution which apparently facilitate the initial formation and stability of the emulsions.

It is an object of the invention to provide an improved system for separating entrapped water from oil which is continuous, economical to operate, capable of handling substantial quantities of associated liquids, and highly efficient.

A further object is to provide such an apparatus wherein the high voltages for the alternating current fields and discharges, and the high voltages for the unidirectional current are supplied from a single current source.

These and other objects and advantages are provided by the method of separating associated liquids having different specific gravities which consists in passing a stream of associated liquids through a plurality of treating zones, subjecting the stream of associated liquids successively to high potential alternating current and high potential unidirectional current while in the treating zones to separate the associated liquids into layers, and collecting the lower of the layers in each of the treating zones while the upper of the layers passes therethrough.

The invention will be more particularly described with reference to the accompanying drawings, in which:

Fig. 1 is a sectional side elevation of one form of the apparatus of the invention on line 1—1 of Fig. 2;

Fig. 2 is an elevational view on line 2—2 of Fig. 1;

Fig. 3 is an enlarged fragmentary view of a group of the electrodes shown in Figs. 1 and 2;

Fig. 6 is a sectional side elevation of another form of the apparatus of the invention;

Fig. 7 is a sectional view on line 7—7 of Fig. 6;

Fig. 8 is an enlarged fragmentary view of one of the weir dams shown in Fig. 6; and Fig. 9 is a sectional view on line 9—9 of Fig. 8.

Figure 4:
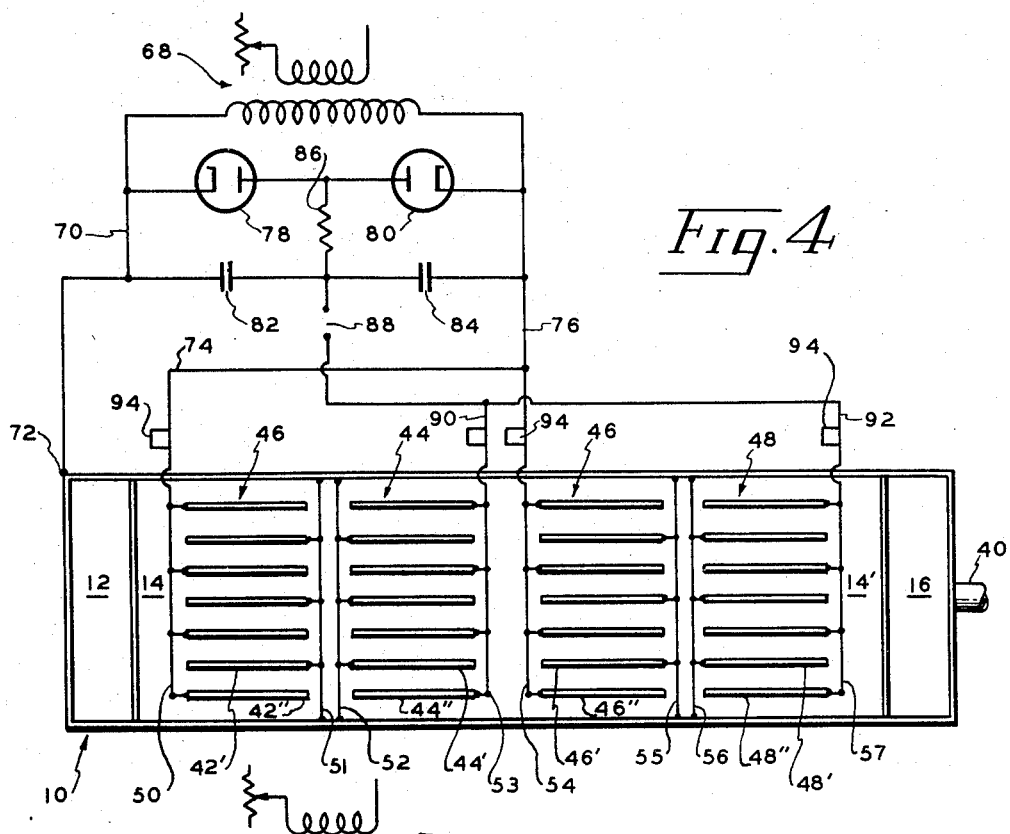
Fig. 4 is a diagrammatic view of the device shown in Figs. 1 and 2 in conjunction with one form of electrical energization circuit.

With reference to the drawings and in particular Figs. 1 through 5, 10 is a tank or container of electrically conductive material. The tank 10 generally comprises four distinct zones, an inlet zone 12, two liquid treating zones 14 and 14', and an oil outlet zone 16.

The mixture to be treated in the apparatus is fed into the inlet zone 12, from which it passes through opening 18 into the first electrical treating zone. The rate of flow of the associated liquid and its path of entry into the treating zone is controlled by adjustable baffles 20 and 22.

The bottom of the treating zones 14 and 14' is of a saw tooth construction, having downwardly sloping portions 24 and 26. These two portions are connected midway between zone 14 and zone 14' by the vertical section 28 of the saw toothed bottom.

At the lowermost points of each treating zone are provided a plurality of discharge pipes 30 and 30' through which trapped water, sludge and other separated products are removed from the treating zones. The discharge pipes are connected to collector pipes and stand pipes, one pair of which are shown at 32 and 34.

The lighter of the separated liquids discharge over an adjustable weir 36 into the discharge zone 16 provided with an outlet pipe 40.

In the form of the invention shown in Figs. 1 through 5, treating zone 14 is provided with two parallel rows of extended surface electrodes generally designated 42 and 44, while treating zone 14' is provided parallel rows of electrodes 46 and 48.

Electrode groups 42, 44, 46 and 48 are supported within the tank 10 by conductive rods 50 and 51; 52 and 53; 54 and 55; and 56 and 57, respectively. These conductive rods are secured to side plates 58 and 60 which are in turn fastened along the upper side edges of the tank 10.

Each parallel row of electrodes, as more clearly shown in Figs. 2 through 5, are constructed of alternate plate electrodes 42' and 42"; 44' and 44"; 46' and 46"; and 48' and 48", respectively. Alternate electrodes are insulated from each other and from the conductive rods 50 through 57 by bushings 62 constructed of insulating material. Electrodes 42', 44', 46' and 48' are of the same polarity as that of tank 10, and electrodes 42", 44", 46" and 48" are of a polarity opposite to that of the tank.

Rods 50, 53, 54 and 57 are insulated from side plates 58 and 60 and from electrodes 42', 44', 46' and 48', respectively.

Rods 51, 52, 55 and 56 make electrical contact with side plates 58 and with electrode plates 42′, 44′, 46′ and 48′, respectively.

The lower ends of the electrodes do not extend into the sloping bottom portion of the treating zone but are short thereof by a distance at least as great as the electrical clearance between adjacent plate electrodes of each group.

With particular reference to Fig. 4 there is shown a diagrammatic plan view of the apparatus and a typical energization system therefor. In this form of the invention all of the electrodes of each group are spaced an equal distance apart and the electrodes of groups 42 and 46 are energized with alternating current. The electrodes of groups 44 and 48 are energized with unidirectional pulsating current.

A transformer 68 supplies the high potential alternating current. One lead 70 from the transformer is connected to the conductive tank at 72; electrodes 42′, 44′, 46′ and 48′ are all connected thereto through rods 51, 52, 55 and 56. The alternating current is completed to electrodes of electrode groups 42 and 46 through conductors 74 and 76 which are connected to the other transformer lead.

The transformer 68 is also electrically connected to electrodes 44″ of group 44, and 48″ of group 48 through rectifier tubes 78 and 80, condensers 82 and 84, resistance 86, spark gap 88, and conductors 90 and 92. The inclusion of the condensers 82 and 84, the resistance 86, and spark gap 88 in the circuit provides the electrodes of electrode groups 44 and 48 with high frequency unidirectional current pulses. By omitting these elements, non-pulsating unidirectional current is obtained.

In each of the high voltage lines 74, 76, 90 and 92 ballasting means 94 may be provided for controlling and regulating the current and voltages to the different electrodes. These ballasting means may consist of resistances, choke coils, and the like which are well known in the art. From the foregoing description it will be seen that the current discharges within the electrode groups are at right angles to the flow of liquid to be treated and that there are electric fields created and electrical discharges between the groups 42 and 44 and between groups 46 and 48. These latter discharges are of unidirectional pulsating direct current and are generally in a direction parallel with the liquid flow through the tank 10.

Figure 5:
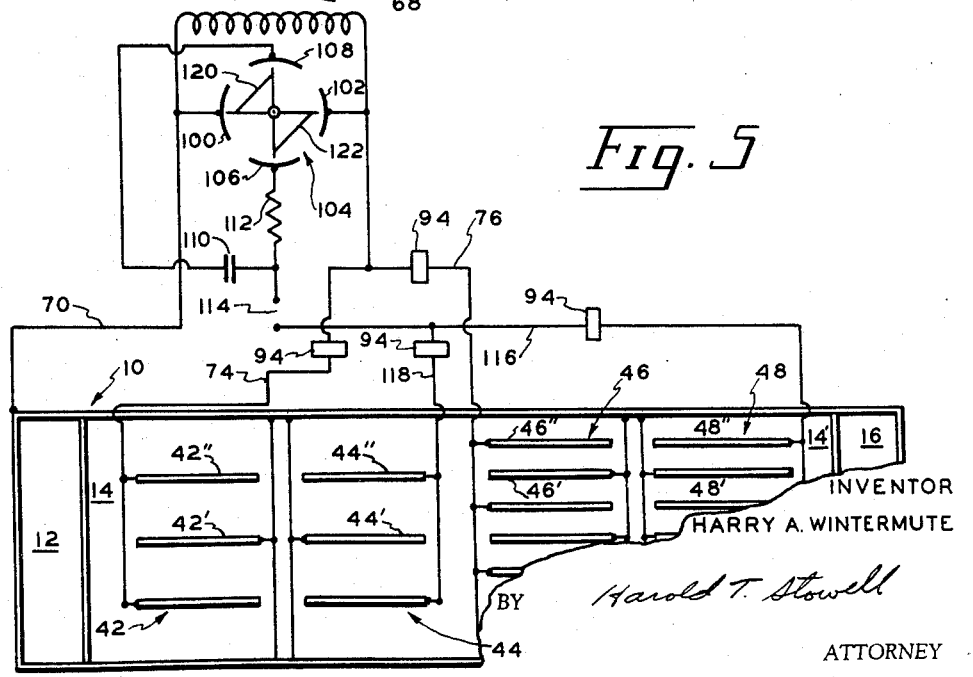
Fig. 5 is a diagrammatic view of the apparatus of the invention in conjunction with another form of electrical energization circuit.

In Fig. 5 a modified electrical energization system is shown employing mechanical current rectifying means, and the spacing between the electrodes of groups 42 and 44 is greater than the spacing between the electrodes of groups 46 and 48. The increase in spacings has been found to be advantageous on installations where an oil-water emulsion is to be treated and in which the water content is exceptionally large.

In Fig. 5, 68 is an alternating current transformer which supplies high potential alternating current to the electrodes of electrode groups 42 and 46 through grounded conductor 70 and conductors 74 and 76.

Transformer 68 is also connected to stator members 100 and 102 of the synchronous rotary switch 104. The remaining stator members 106 and 108 are electrically joined externally through a condenser 110 and a resistor 112, and connected to the electrodes 44″ and 48″ through spark gap 114 and conductors 116 and 118. Adjacent pairs of contact points of the four-element rotor are connected together by conductors 120 and 122.

Ballasting means 94 may be provided in the electrical conducting lines 74, 76, 116, and 118.

The operation of the forms of the invention shown in Figs. 4 and 5 are identical; therefore, the operation of the improved electrical separating devices will be described with reference to Fig. 1 through Fig. 5.

In operation, a stream of associated liquids, for example a water-in-oil emulsion, is directed into the inlet chamber 12 from which it flows into the liquid treating zones where the associated liquid divides into a plurality of parallel treating paths between the spaced electrodes. As the liquid to be separated flows through the parallel treating paths it is first subjected to high voltage alternating discharges and high potential fields between electrodes 42′ and 42″; then to high frequency unidirectional current pulses between electrodes 44′ and 44″. This cycle is repeated as the liquid flows between electrodes 46′ and 46″, and electrodes 48′ and 48″. The high potential fields, and electrical discharges between the electrodes, and between the electrodes and the treating tank causes a change in the mixture such that there is a relatively rapid breaking up of the associated liquids and a coalescing and separation of the specific materials of the mixtures into layers according to their specific gravities. In the case of a water-in-oil emulsion, the water, sludges, and heavier particles entrained therein separate and collect in a lower layer at the bottom of the tank. A greater part of the separated and coalesced water and sludge formed in zone 14 is prevented from entering zone 14′ by vertical portion 28 of the saw toothed tank bottom. These materials are withdrawn through outlet pipes 30. The oil separated from the mixture coalesces and forms an upper layer which passes over the vertical portion 28 and into treating zone 14′. Further separation takes place in treating zone 14′ and the oil portion flows over weir 36 and into the oil outlet zone 16 while the heavier water and sludge is trapped and withdrawn through outlets 30′.

In order to increase the electrical discharge within the treating zone, some or all of the electrodes may be provided with discharge points or serrations. For example, only the electrodes in electrode groups 44 and 46 may be provided with the discharge points. It is further evident that while only four groups of electrodes are shown, as many groups as desired can be placed either in parallel or series relationship.

With reference to Figs. 6 through 9, a modified form of the separation apparatus is shown.

In this form of the invention the electrodes are in the form of a plurality of rods, and a heating means for the treatment tank is provided.

In Figs. 6 through 9, 150 is a tank constructed of conductive material having a generally downwardly sloping bottom 152, an inlet zone 154 at its upper end, and an outlet zone 156 at its lower end. The inlet and outlet zones are separated from the liquid treating zones by vertically disposed partitions or weirs 158 and 160, respectively, having adjustable upper ends 162 and 164, respectively.

Positioned between the inlet and outlet partitions are weirs 166 and 168 having adjustable members 170 and 172 provided at their upper ends. The weirs 166 and 168 divide the liquid treating tank into three treating zones 174, 176, and 178. These zones, as clearly shown in Fig. 6, are progressively shorter in the direction of liquid flow.

The weirs 158, 160, 166 and 168 are provided with a sheet of insulating material 180 between the upper and the lower members, as shown more clearly in Figs. 8 and 9, to reduce arc-over between the electrodes and the weir members as to more fully described hereinafter. The sheets of insulating material 180 have end portions 182 which extend upwardly above the upper edge of the weir members. The extended end portions cause the liquid mixture to flow at a lower rate along the side edges of the treating tank, thereby increasing the effectiveness of the electrical action adjacent the side walls where the electrode spacing is greatest as shown in Fig. 7.

At substantially the lowermost points of each treating zone are provided discharge pipes 184 through which water, sludge and the heavier separated materials are removed. The materials having less specific gravity flow over the weir members and are finally removed from the outlet zone 156 through a plurality of outlet pipes 186.

It has been found that in many instances associated liquids are more readily separated if the mixture is maintained at an optimum temperature. In order to control the temperatures within each treating zone a chamber is provided beneath the tank 150 which is divided into temperature control zones 174', 176', and 178' by parallel partitions 188 and 190 which extend between the bottom of the tank 150 and the bottom of the chamber 192.

Cooling or heating liquids or gases are passed into these zones through conduits 194, 196 and 198 and withdrawn therefrom through conduits 200, 202 and 204.

Supported above the tank 150 are a plurality of cylindrical electrodes. Electrodes 206, 208 and 210 are supported from electrode supports 212, 214 and 216, respectively. These electrode supports are adjustably fastened to a conductive plate 218 which is suspended above the tank 150 by insulators 220.

Electrodes 222, 224 and 226 are supported from electrode supports 228, 230 and 232, respectively. These supports are adjustably fastened to a conductive plate 234 which is in turn suspended above the tank 150 by insulators 236.

In the form of the invention shown in Fig. 6, electrodes 206, 208 and 210 are positioned so that the lower ends of the electrodes are in contact with the surface of the liquid to be treated in the ponds or zones 174, 176, and 178, respectively about midway across the zones. These electrodes and the tank are energized with alternating current through conductors 238 and 240 from the high voltage transformer 68'.

Electrodes 222 and 226 are positioned so that the lower ends thereof are above the weir members 170 and 172 with a slight air gap between the liquid to be treated and the discharge electrodes. Electrodes 224 are positioned so that the lower ends thereof are in contact with the surface of the liquid to be treated in zone 176 midway between electrodes 226 and 208.

The electrodes 222, 224 and 226 are energized with unidirectional current from the transformer 68' which is electrically connected to these electrodes through the stator members of the synchronous rotary switch 240' and conductors 242, 244, 246, and 248.

In operation of the form of the invention shown in Figs. 6 through 9, a stream of associated liquids, for example an oil and water emulsion, is directed into the inlet zones 154 from which it flows through the inclined treating zones. However, it will be seen that the flow of liquid within any one of the treating zones moves in a substantially horizontal direction. During the horizontal movement, the liquid is treated electrically to separate it into its components; the lighter of which passes over the tops of the weirs and the heavier portion is trapped at the lower ends of the weirs where it is removed through discharge pipes 182. Due to the shape of the treating tank, there is substantial turbulence in the liquid as it moves across each treating zone, which aids in the coalescence of the heavier portion of the liquids. When the liquid breaks over the weir members, the following additional liquid treating actions occur:

(1) A high potential field or discharge is established along a relatively thin sheet of the liquid. The electrical discharge can be initiated from above or below the thin sheet of emulsion by varying the shape and position of the electrodes above the weir members; thus the particles which form the inner phase of the emulsion may be drawn towards or away from the weir as desired.

(2) As the liquid flows over and down the weirs there is an increase in turbulence which aids in bringing the particles of the inner phase close together so that the separating film of oil will break down and permit the inner phase particles to coalesce.

The position of the electrodes 206, 208, 210, 222, 224, and 226 may be varied considerably. For example, the electrodes may be placed in contact with the liquid or an air gap may exist between the electrodes and the top of the liquid. In the drawings the electrodes located substantially over the center of the treating zones are energized with alternating current while the others are energized with unidirectional current. However, the location of these electrodes may be reversed or arranged in various sequences and the energization means shown in Figs. 4 or 5 may advantageously be employed in conjunction with the form of the invention shown in Fig. 6.

The electrodes can be adjusted at heights above the surface of the emulsion; in contact with it, or they may penetrate below the surface of the emulsion. By raising the electrodes above the surface varying conditions of operation can be obtained. For example, at the inlet end, where the water content of the emulsion is high the distance between the electrodes and the surface of the liquid may be large to give low voltage and energization effects. At the liquid discharge end of the treating tank the water content is low and the electrodes may touch or penetrate the liquid surfaces. The preferred range of pulsations of the current will depend to a great extent upon the conditions of the emulsions. However, it has been found that frequencies as low as commercial frequencies of $\frac{1}{60}$ and $\frac{1}{120}$ sec. for 25 and 60 cycles respectively give satisfactory results, and frequencies as high as $.10^{-6}$ sec. may be used.

The following are examples of dehydration of emulsions of the water-in-oil type by the apparatus and method of the invention.

*Example I*

| Type of emulsion | "Vacuum" oil and water |
|---|---|
| Temperature of emulsion | 80° F. |
| Volume of water | 36%. |
| Applied voltage | 550. |
| Type of current | 60 cycle A. C. and nonpulsating D. C. |
| Rate of flow, G. P. H | 100. |
| Plate spacing | ½ inch. |
| Plate from bottom | 1¼ inches. |
| Number of plate sections | 6. |

*Example II*

| Type of emulsion | "Vacuum" oil and water |
|---|---|
| Temperature of emulsion | 140° F. |
| Volume of water | 39%. |
| Applied voltage | 825. |
| Type of current | 25 cycle A. C. and pulsating D. C. $\frac{1}{50}$ sec. |
| Rate of flow, G. P. H | 225. |
| Plate spacing | ½ inch. |
| Plates from bottom | 2 inches. |
| Number of plate sections | 6. |

*Example III*

| Type of emulsion | "Valvoline" oil and water |
|---|---|
| Temperature of emulsion | 115° F. |
| Volume of water | 18%. |
| Applied voltage | 2,200. |
| Type of current | 60 cycle A. C. and pulsating D. C. $\frac{1}{120}$ sec. |
| Rate of flow, G. P. H | 90. |
| Plate spacing | 1 inch. |
| Plates from bottom inlet | 3 inches. |
| Plates from bottom outlet | 2 inches. |
| Number of plate sections | 6. |

*Example IV*

| Type of emulsion | "Valvoline" oil and water |
|---|---|
| Temperature of emulsion | 140° F. |
| Volume of water | 20%. |
| Number of sections | 3. |
| Applied voltage | 1,000. |
| Type of current | 25 cycle A. C. and nonpulsating D. C. |
| Number of electrode groups | 5. |
| Distance of electrodes above ponds | 0. |
| Distance of electrodes above weirs | ¼ inch. |
| Rate of flow, G. P. H | 55. |

Example V

| Type of emulsion | "Vacuum" oil and water |
|---|---|
| Temperature of emulsion | 80° F. |
| Volume of water | 40%. |
| Number of electrode groups | 5. |
| Distance electrodes above ponds inlet | ½ inch. |
| Distance electrodes above ponds outlet | 0. |
| Applied voltage electrodes above ponds | 1,500 A. C. |
| Distance electrodes above weirs | ¼ inch. |
| Applied voltage electrodes above weirs | 1,200 D. C. |
| Rate of flow, G. P. H | 90. |

From the foregoing description it will be seen that the present invention provides an improved method and apparatus for separating associated liquids whereby the aims, objects, and advantages of the invention are fully accomplished.

I claim:

1. Apparatus for separating water-in-oil emulsions comprising a treating tank of electrically conductive material connected to one terminal of a source of alternating current, an inlet for an emulsion to be separated at one end of the tank, a partition member extending across the tank at right angles to the direction of flow of the emulsion through the tank and forming therewith successive treating zones, said partition member extending upwardly from the bottom of said tank to a position below the upper edge of the tank side walls, means for successively subjecting a water-in-oil emulsion passing through each of the treating zones in the tank to a high potential alternating current field and a high potential unidirectional current field said means including a first set of electrodes adjacent the upper surface of said emulsion and spaced from the walls of the tank and said partition member and connected to the other terminal of the source of alternating current, a second set of electrodes positioned above and parallel to said partition member and spaced from said first set of electrodes and the walls of the tank, alternating current rectifier means connected to the source of alternating current, and electrical conductor means connecting the output of the rectifier means to the second set of electrodes, first outlet means at the other end of the tank for removing the upper layer of the liquid passing through the tank, and second outlet means communicating with the bottom of the tank for removing the lower layer of liquid passing through the tank.

2. Apparatus for separating water-in-oil emulsions comprising a treating tank of electrically conductive material connected to one terminal of a source of alternating current, an inlet for an emulsion to be separated at one end of the tank, weir means of conductive material projecting substantially vertically upwardly and at right angles to the direction of flow of the emulsion from the bottom surface of the tank to define with the tank successive emulsion treating zones, first electrode means supported above the tank and spaced from said weir means, second electrode means supported parallel to and above said weir means and electrically insulated from the first electrode means, electrical conductor means connecting the first electrode means with the other terminal of the source of alternating current, electrical conductor means connecting the second electrode means to a source of high potential unidirectional current, first outlet means at the other end of the tank for removing the upper portion of the separated emulsion, and second outlet means communicating with the bottom of said tank for removing the lower portion of the separated emulsion.

3. The invention defined in claim 2 wherein the second outlet means communicates with the bottom of said tank at the base of said weir means and on the upstream side thereof.

References Cited in the file of this patent

UNITED STATES PATENTS

| | | |
|---|---|---|
| 1,559,035 | Egloff | Oct. 27, 1925 |
| 2,000,654 | Wintermute | May 7, 1935 |
| 2,049,561 | Grave | Aug. 4, 1936 |
| 2,230,023 | Aten | Jan. 28, 1941 |